US012789913B2

(12) United States Patent
Osaka et al.

(10) Patent No.: US 12,789,913 B2
(45) Date of Patent: Nov. 10, 2026

(54) VEHICLE LOWER STRUCTURE

(71) Applicant: TOYOTA JIDOSHA KABUSHIKI KAISHA, Toyota (JP)

(72) Inventors: Ryuma Osaka, Toyota (JP); Shungo Iizuka, Toyota (JP); Naoki Tani, Toyota (JP); Yuuki Mukaigawa, Seto (JP); Masanori Kodera, Toyota (JP); Kyohei Miyaoka, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 18/624,586

(22) Filed: Apr. 2, 2024

(65) Prior Publication Data

US 2024/0375722 A1 Nov. 14, 2024

(30) Foreign Application Priority Data

May 9, 2023 (JP) ................................ 2023-077382

(51) Int. Cl.
*B62D 25/20* (2006.01)
*B60K 1/04* (2019.01)

(52) U.S. Cl.
CPC .. *B62D 25/2009* (2013.01); *B60K 2001/0438* (2013.01); *B60Y 2306/01* (2013.01)

(58) Field of Classification Search
CPC ... B60K 1/04; B60K 2001/0438; B60L 50/66; B60Y 2306/01; B62D 25/025; B62D 25/082; B62D 25/20; B62D 25/2009; B62D 25/2036
See application file for complete search history.

(56) References Cited

U.S. PATENT DOCUMENTS

| | | | | |
|---|---|---|---|---|
| 10,661,840 | B1 * | 5/2020 | Saje | B62D 25/2018 |
| 2012/0097466 | A1 * | 4/2012 | Usami | B60K 1/04 180/68.5 |
| 2012/0161429 | A1 * | 6/2012 | Rawlinson | B62D 25/025 280/801.1 |
| 2015/0239331 | A1 * | 8/2015 | Rawlinson | B62D 21/157 180/68.5 |
| 2018/0127032 | A1 | 5/2018 | Atsumi et al. | |
| 2019/0275875 | A1 * | 9/2019 | Fukui | B60K 1/04 |
| 2022/0258620 | A1 * | 8/2022 | Iemura | B60L 50/66 |

FOREIGN PATENT DOCUMENTS

| | | | | |
|---|---|---|---|---|
| DE | 102019115000 | A1 * | 5/2020 | B62D 27/026 |
| JP | 10-291419 | A | 11/1998 | |
| JP | 2012-091635 | A | 5/2012 | |
| JP | 2018-075940 | A | 5/2018 | |

* cited by examiner

*Primary Examiner* — Lori Lyjak
(74) *Attorney, Agent, or Firm* — Sughrue Mion, PLLC

(57) ABSTRACT

A vehicle lower structure includes an electricity storage device, a rocker, a front suspension member, a torque box, a floor panel, and a protector. The front suspension member is disposed on a front side of the electricity storage device. The torque box lies side-by-side with the electricity storage device in a horizontal direction. The torque box connects the rocker and the front suspension member to each other. The floor panel is disposed on an upper side of the electricity storage device and connected to the torque box. The protector is disposed on the electricity storage device. The protector is disposed so as to face a lower end of the torque box in the horizontal direction.

4 Claims, 3 Drawing Sheets

VEHICLE LOWER STRUCTURE

CROSS-REFERENCE TO RELATED APPLICATION

This application claims priority to Japanese Patent Application No. 2023-077382 filed on May 9, 2023, incorporated herein by reference in its entirety.

BACKGROUND

1. Technical Field

This disclosure relates to a vehicle lower structure.

2. Description of Related Art

Japanese Unexamined Patent Application Publication No. 2018-75940 (JP 2018-75940 A) discloses a conventional vehicle lower structure. The vehicle lower structure described in JP 2018-75940 A has a floor panel, a pair of left and right side members, an electricity supply unit, a cross part, and torque boxes. The electricity supply unit is disposed between side members on a vehicle lower side of the floor panel. Each torque box is disposed outward of the corresponding side member in a vehicle width direction, at a position at which a vertical wall part of the torque box on a vehicle rear side overlaps a vertical wall part of the cross part on the vehicle rear side as seen from the vehicle width direction, and is joined to the side member and a rocker that extends in a vehicle front-rear direction along a peripheral edge portion of the floor panel on an outer side in the vehicle width direction.

SUMMARY

When a vehicle including the conventional vehicle lower structure experiences a collision from a lateral side, the torque box becomes crushed while shifting toward the electricity storage device (electricity supply unit). As a result, the floor panel connected to the torque box deforms toward the electricity storage device. The deformed floor panel may come into contact with the electricity storage device.

This disclosure provides a vehicle lower structure that can reduce the likelihood of contact between a deformed floor panel and an electricity storage device in the event of a lateral collision of the vehicle.

A vehicle lower structure according to one aspect of this disclosure includes an electricity storage device, a rocker, a front suspension member, a torque box, a floor panel, and a protector. The electricity storage device is disposed at a lower part of a vehicle. The rocker lies side-by-side with the electricity storage device in a left-right direction of the vehicle. The rocker extends along a front-rear direction of the vehicle. The front suspension member is disposed on a front side of the electricity storage device. The front suspension member is disposed inward of the rocker in the left-right direction. The torque box lies side-by-side with the electricity storage device in a horizontal direction. The torque box connects the rocker and the front suspension member to each other. The floor panel is disposed on an upper side of the electricity storage device and connected to the torque box. The protector is disposed on the electricity storage device. The protector is disposed so as to face a lower end of the torque box in the horizontal direction.

According to this configuration, when the torque box shifts toward the electricity storage device in the event of a lateral collision of the vehicle, the lower end of the torque box comes into contact with the protector. As the lower end of the torque box becomes crushed while in contact with the protector, the floor panel deforms so as to be pushed upward by the torque box. This can reduce the likelihood of contact between the deformed floor panel and the electricity storage device in the event of a lateral collision of the vehicle.

In the vehicle lower structure according to the one aspect of this disclosure, the electricity storage device may include an electricity storage cell and a housing case that houses the electricity storage cell. The housing case may have a lower case having an opening that opens toward the upper side, and an upper case disposed so as to cover the opening. The upper case may have a flange part that faces the lower case in an up-down direction. The protector may lie side-by-side with the flange part in the horizontal direction.

According to this configuration, in the event of a lateral collision of the vehicle, the torque box is likely to come into contact with the protector before coming into contact with the electricity storage device, which can reduce the likelihood that the torque box may come into contact with the electricity storage device and deform the electricity storage device.

In the vehicle lower structure according to the one aspect of this disclosure, the protector may be located only on a lower side of the center of the upper case in the up-down direction.

According to this configuration, the protector is made comparatively smaller and the weight of the protector can be reduced. In the vehicle lower structure according to the one aspect of this disclosure, the electricity storage device may include an electricity storage cell and a housing case that houses the electricity storage cell. The housing case may have a lower case having an opening that opens toward the upper side, and an upper case disposed so as to cover the opening. The upper case may have a flange part that faces the lower case in an up-down direction. The protector may be disposed on a lower side of the flange part.

According to this configuration, for example, when a vehicle including this vehicle lower structure undergoes high-pressure washing or when this vehicle travels on a flooded road, the protector can reduce the likelihood that a part where the flange part of the upper case and the lower case face each other may get splashed with water from below. By extension, the likelihood that water may enter inside the housing case can be reduced.

In the vehicle lower structure according to the one aspect of this disclosure, the protector may be in contact with the lower case on the lower side of the flange part.

According to this configuration, the protector can further reduce the likelihood that the part where the flange part of the upper case and the lower case face each other may get splashed with water from below. By extension, the likelihood that water may enter inside the housing case can be further reduced.

According to this disclosure, the likelihood of contact between the deformed floor panel and the electricity storage device in the event of a lateral collision of the vehicle can be reduced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
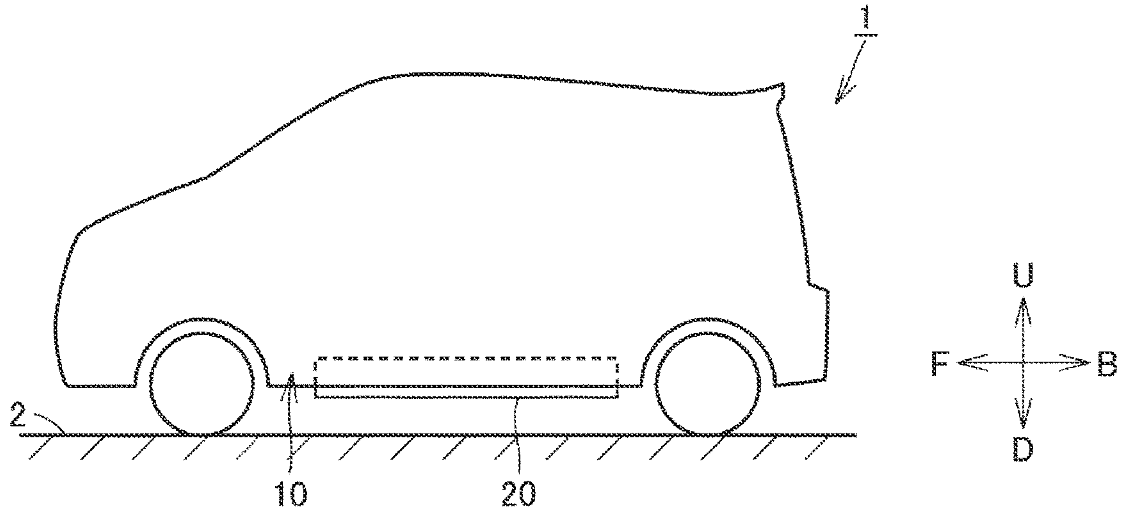
FIG. 1 is a schematic side view showing a vehicle including a vehicle lower structure according to one embodiment of this disclosure.

A vehicle lower structure according to one embodiment of this disclosure will be described below with reference to the drawings. In the following description of the embodiment, the same or corresponding parts in the drawings will be denoted by the same reference sign and description thereof will not be repeated.

FIG. 1 is a schematic side view showing a vehicle including the vehicle lower structure according to the one embodiment of this disclosure. As shown in FIG. 1, a vehicle lower structure 10 according to the one embodiment of this disclosure is located at a lower part of a vehicle 1. In FIG. 1 and FIG. 2 to FIG. 6 to be described later, a front side F, a back side B, a leftward direction L, a rightward direction R, an upper side U, and a lower side D of the vehicle 1 including the vehicle lower structure 10 are indicated by arrows. In this embodiment, the vehicle lower structure 10 faces a road surface 2 on which the vehicle 1 travels in an up-down direction.

Figure 2:
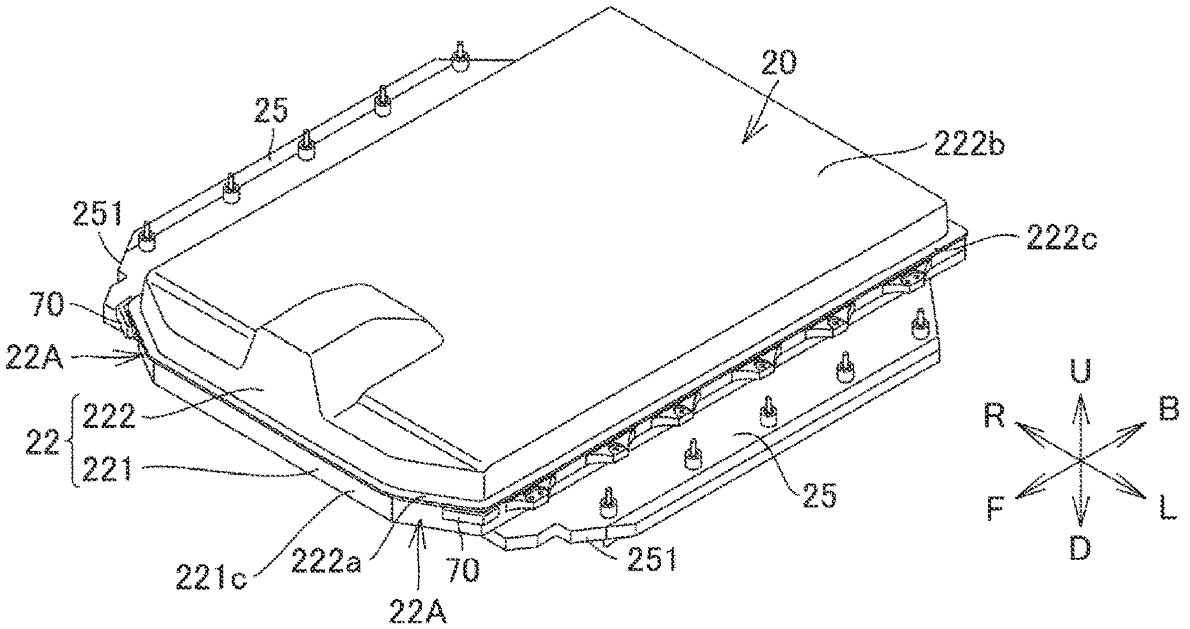
FIG. 2 is a perspective view showing the configuration of part of the vehicle lower structure according to the one embodiment of this disclosure.
Figure 3:
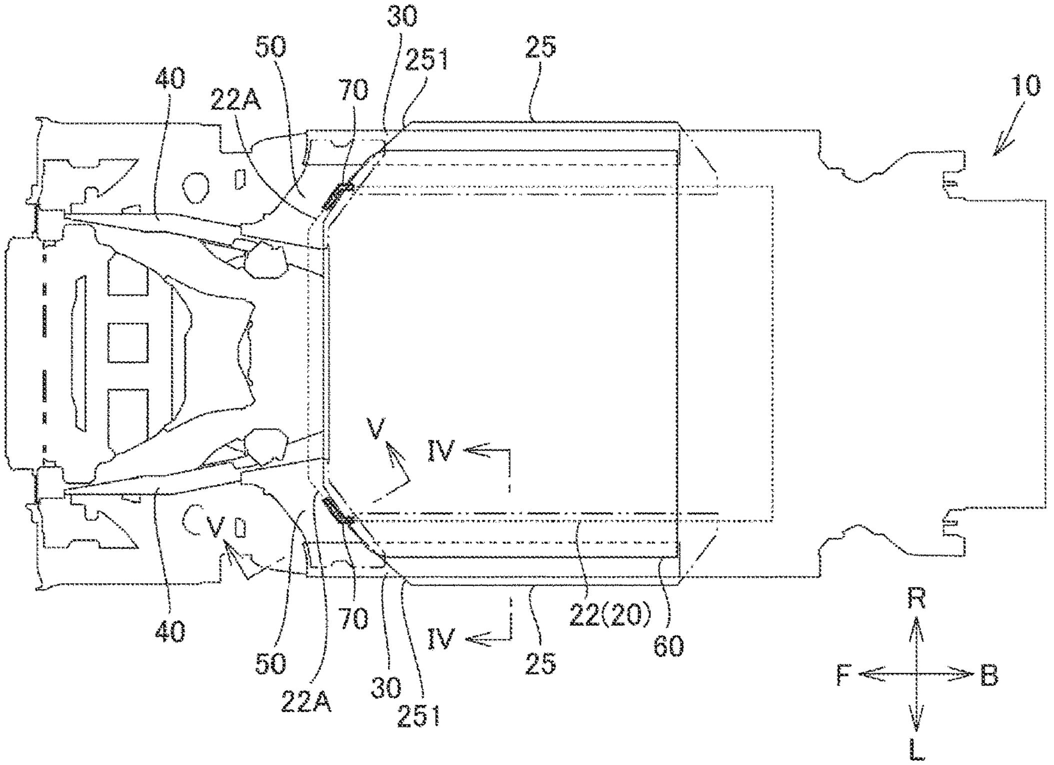
FIG. 3 is a plan view showing the vehicle lower structure according to the one embodiment of this disclosure.
Figure 4:
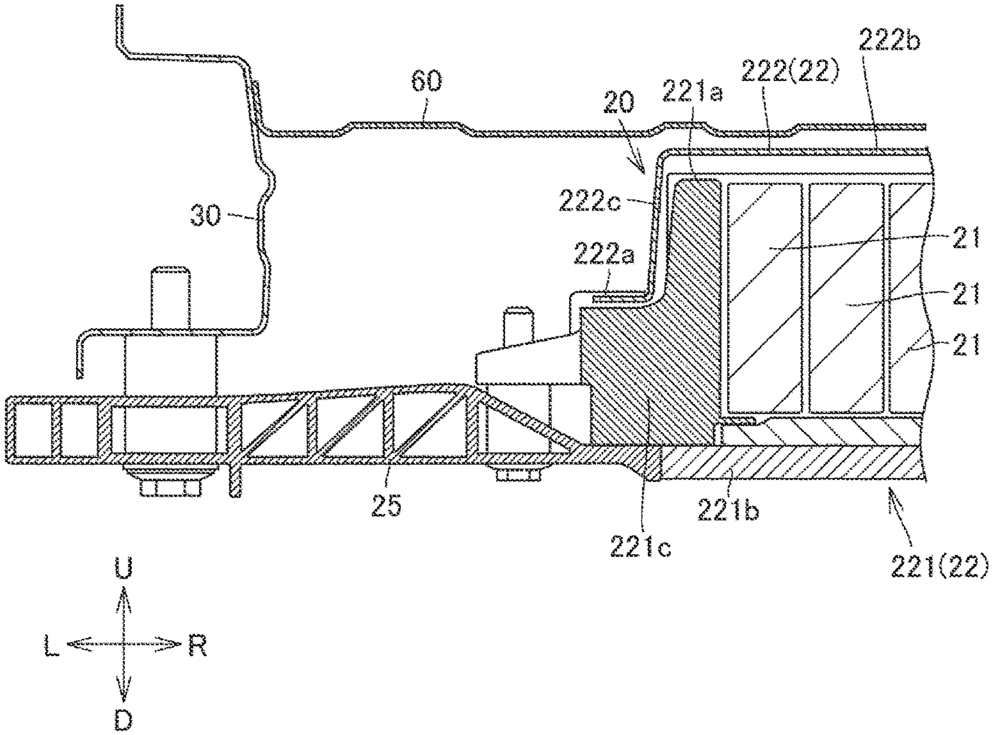
FIG. 4 is a sectional view of part of the vehicle lower structure of FIG. 3 as seen from the direction of arrows IV-IV.
Figure 5:
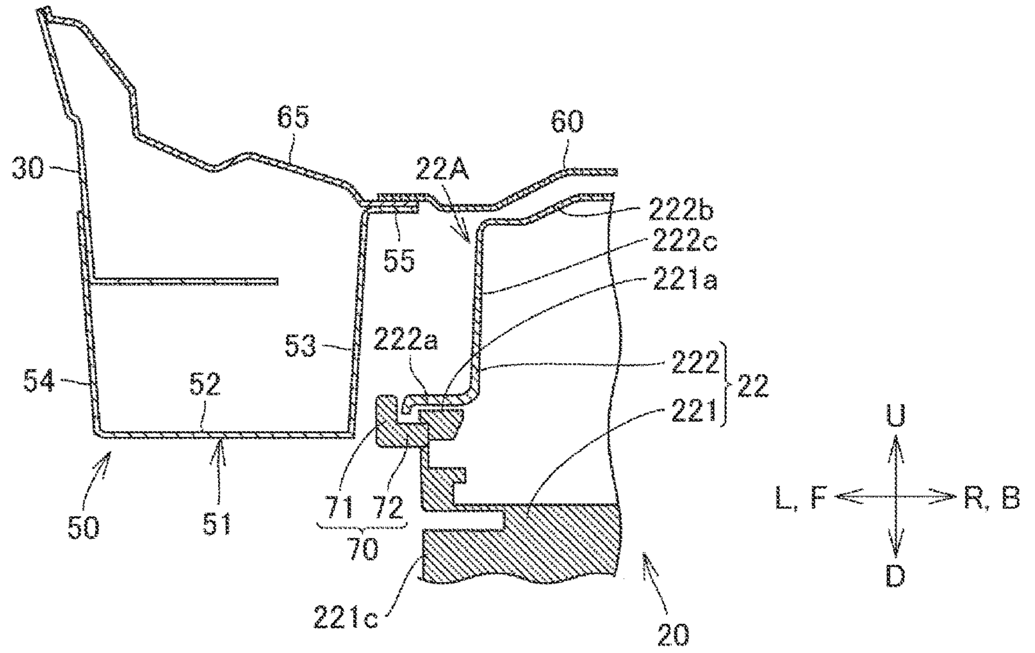
FIG. 5 is a sectional view of part of the vehicle lower structure of FIG. 3 as seen from the direction of arrows V-V.

FIG. 2 is a perspective view showing the configuration of part of the vehicle lower structure according to the one embodiment of this disclosure. FIG. 3 is a plan view showing the vehicle lower structure according to the one embodiment of this disclosure. FIG. 4 is a sectional view of part of the vehicle lower structure of FIG. 3 as seen from the direction of arrows IV-IV. FIG. 5 is a sectional view of part of the vehicle lower structure of FIG. 3 as seen from the direction of arrows V-V.

As shown in FIG. 1 to FIG. 5, the vehicle lower structure 10 according to the one embodiment of this disclosure includes an electricity storage device 20, a pair of rockers 30, a pair of front suspension members 40, a pair of torque boxes 50, a floor panel 60, and a pair of protectors 70.

As shown in FIG. 1, the electricity storage device 20 is disposed at a lower part of the vehicle 1. The electricity storage device 20 faces the road surface 2 on which the vehicle 1 including the vehicle lower structure 10 travels in the up-down direction.

As shown in FIG. 2 to FIG. 5, the electricity storage device 20 includes a plurality of electricity storage cells 21 (see FIG. 4) and a housing case 22. The housing case 22 houses the plurality of electricity storage cells 21.

The electricity storage cells 21 are secondary batteries, for example, nickel-metal hydride batteries or lithium-ion batteries. The electricity storage cells 21 have, for example, a square shape. The secondary batteries may be those that use a liquid electrolyte or may be those that use a solid electrolyte.

When seen from the upper side U, the housing case 22 has a substantially rectangular outer shape. The housing case 22 has a pair of front side walls 22A. When seen from the upper side U, the pair of front side walls 22A is located on the front side F of the housing case 22, at both end portions in a left-right direction (vehicle width direction). When seen from the upper side, the pair of front side walls 22A extends obliquely relative to both a front-rear direction and the left-right direction. On an upper surface of the housing case 22 near the pair of front side walls 22A, a high-voltage member (not shown), such as a bus-bar, to which a high voltage is applied during travel of the vehicle 1 is located.

The housing case 22 has a lower case 221 and an upper case 222. Each front side wall 22A is formed by part of the lower case 221 and part of the upper case 222.

The lower case 221 has an opening 221*a*, a bottom wall part 221*b*, and a peripheral side wall part 221*c*. The opening 221*a* opens toward the upper side U. The bottom wall part 221*b* is located on the lower side D of the electricity storage cells 21. The bottom wall part 221*b* faces the road surface 2 on which the vehicle 1 including the vehicle lower structure 10 travels in the up-down direction. The peripheral side wall part 221*c* rises from the bottom wall part 221*b* toward the upper side U. As seen from the up-down direction, the peripheral side wall part 221*c* surrounds the plurality of electricity storage cells 21. The opening 221*a* is located at an end portion of the peripheral side wall part 221*c* on the opposite side from the bottom wall part 221*b*.

The upper case 222 is disposed so as to cover the opening 221*a*. The upper case 222 has a flange part 222*a*, an upper surface part 222*b*, and a peripheral side surface part 222*c*. The flange part 222*a* faces the lower case 221 in the up-down direction. The flange part 222*a* extends along a horizontal direction. The horizontal direction is a direction along both the front-rear direction and the left-right direction. The upper surface part 222*b* is located on the upper side U of the electricity storage cells 21. The upper surface part 222*b* extends along the horizontal direction. The peripheral side surface part 222*c* connects the flange part 222*a* and the upper surface part 222*b* to each other.

The vehicle lower structure 10 according to this embodiment further includes a pair of shock-absorbing members 25. Each shock-absorbing members 25 is configured to be able to absorb shock energy resulting from a collision from the opposite side from the electricity storage device 20 by undergoing compressive deformation.

The pair of shock-absorbing members 25 is connected to both sides of the electricity storage device 20 in the left-right direction of the vehicle 1. The shock-absorbing members 25 extend outward in the left-right direction from a lower end of the housing case 22. Specifically, the shock-absorbing members 25 extend outward in the left-right direction from the bottom wall part 221*b* of the lower case 221.

The shock-absorbing members 25 extend along the front-rear direction. A front end edge 251 of each shock-absorbing member 25 turns roughly inward in the left-right direction as it extends toward the front side F.

The pair of rockers 30 lies side-by-side with the electricity storage device 20 in the left-right direction of the vehicle 1. The pair of rockers 30 lies side-by-side with the electricity storage device 20 respectively on both sides of the vehicle 1 in the left-right direction. The electricity storage device 20 and the rockers 30 are separated from each other. Each of the pair of rockers 30 is connected to the electricity storage device 20 by the shock-absorbing member 25 that is the corresponding one in the left-right direction.

The rockers 30 extend along the front-rear direction of the vehicle 1. As seen from the up-down direction, the rockers 30 extend toward the front side F beyond the front end edges 251 of the shock-absorbing members 25.

The pair of front suspension members 40 is disposed on the front side F of the electricity storage device 20. The pair of front suspension members 40 is disposed symmetrically in the left-right direction of the vehicle 1. When seen from the up-down direction, each of the pair of front suspension members 40 extends toward the front side F from inward of the front side wall 22A. The front suspension members 40 are disposed inward of the rockers 30 in the left-right direction.

The pair of torque boxes 50 lies side-by-side with the electricity storage device 20 in the horizontal direction. Specifically, the pair of torque boxes 50 lies side-by-side respectively with the pair of front side walls 22A of the housing case 22 in the horizontal direction (see FIG. 5).

Each torque box 50 connects the corresponding rocker 30 in the left-right direction and the corresponding front suspension member 40 in the left-right direction to each other (see FIG. 3). The torque boxes 50 turn inward in the left-right direction as they extend toward the front side F. The torque boxes 50 extend along the front side walls 22A. When seen from the up-down direction, the torque boxes 50 extend along the front end edges 251 of the shock-absorbing members 25.

As shown in FIG. 5, each torque box 50 has a lower plate part 52, an inner plate part 53, an outer plate part 54, and an upper plate part 55.

The lower plate part 52 constitutes a lower end 51 of the torque box 50. The lower plate part 52 extends along the horizontal direction. The inner plate part 53 extends roughly toward the upper side U from an end portion of the lower plate part 52 on the side of the electricity storage device 20. The outer plate part 54 extends roughly toward the upper side U from an end portion of the lower plate part 52 on the opposite side from the electricity storage device 20. The upper plate part 55 extends along the horizontal direction from an end portion of the inner plate part 53 on the opposite side from the lower plate part 52. The upper plate part 55 extends toward the opposite side from the outer plate part 54 in the horizontal direction.

The floor panel 60 is disposed on the upper side U of the electricity storage device 20. The floor panel 60 faces the upper surface part 222*b* of the upper case 222 in the up-down direction. The floor panel 60 is joined at both sides in the left-right direction respectively to the pair of rockers 30 (see FIG. 4). The floor panel 60 is connected to the torque boxes 50.

The vehicle lower structure 10 according to this embodiment further includes a dashboard cross-member 65. The dashboard cross-member 65 is joined to a front end portion of the floor panel 60. In this embodiment, the torque boxes 50 are connected to the floor panel 60 through the dashboard cross-member 65. Alternatively, the torque boxes 50 may be directly joined to the floor panel 60. Front end portions of the rockers 30 are connected to the floor panel 60 through the dashboard cross-member 65.

The pair of protectors 70 is disposed on the electricity storage device 20. Specifically, the pair of protectors 70 is disposed respectively on the pair of front side walls 22A of the housing case 22. The protectors 70 further extend toward the back side B from the front side walls 22A.

The protectors 70 are disposed so as to face the lower ends 51 (lower plate parts 52) of the torque boxes 50 in the horizontal direction. The protectors 70 lie side-by-side with the flange part 222*a* in the horizontal direction. The protectors 70 are disposed also on the lower side of the flange part 222*a*. The protectors 70 are in contact with the lower case 221 on the lower side of the flange part 222*a*. The protectors 70 are located only on the lower side of a center of the upper case 222 in the up-down direction.

The specific shape of the protectors 70 is not particularly limited. In this embodiment, each protector 70 has a side wall part 71 and a lower wall part 72. The side wall part 71 is a part that lies side-by-side with the flange part 222*a* in the horizontal direction. The lower wall part 72 is a part that is disposed on the lower side of the flange part 222*a* and in contact with the lower case 221. The lower wall part 72 extends from a lower end of the side wall part 71 toward the lower case 221.

The material composing the protectors 70 is not particularly limited. In this embodiment, the protectors are composed of metal, more particularly aluminum or an aluminum alloy. The protectors 70 are joined to the housing case 22 (lower case 221) by welding.

Figure 6:
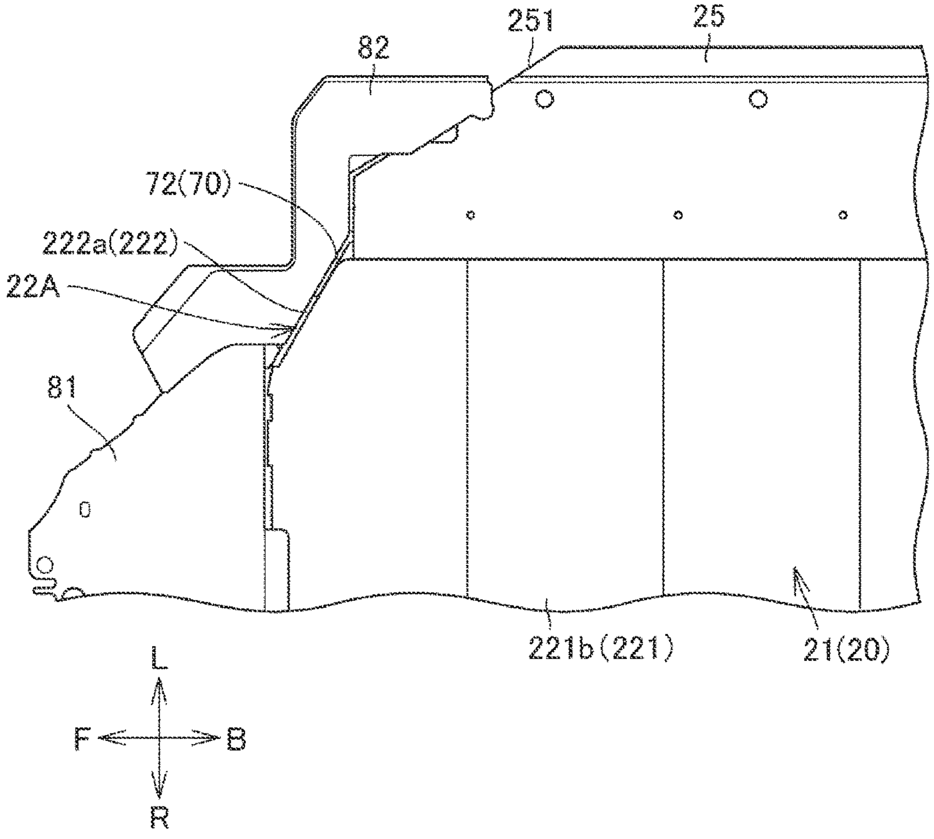
FIG. 6 is a bottom view showing part of the vehicle lower structure according to the one embodiment of this disclosure as seen from below.

FIG. 6 is a bottom view showing part of the vehicle lower structure according to the one embodiment of this disclosure as seen from below. As shown in FIG. 6, the vehicle lower structure 10 according to the one embodiment of this disclosure further includes a front suspension member brace 81 and an undercover 82.

The front suspension member brace 81 extends toward the front side F from the bottom wall part 221*b* of the lower case 221. The undercover 82 connects the shock-absorbing member 25 and the front suspension member brace 81 to each other.

The undercover 82 faces the road surface 2 on which the vehicle 1 travels in the up-down direction. When seen from the up-down direction, the undercover 82 extends along the front side wall 22A of the housing case 22. The undercover 82 covers a portion of the flange part 222*a* in the front side wall 22A. However, when seen from the lower side D, the undercover 82 may be separated from the bottom wall part 221*b* of the lower case 221.

As has been described above, the vehicle lower structure 10 according to the one embodiment of this disclosure includes the electricity storage device 20, the rockers 30, the front suspension members 40, the torque boxes 50, the floor panel 60, and the protectors 70. The electricity storage device 20 is disposed at the lower part of the vehicle 1. The rockers 30 lie side-by-side with the electricity storage device 20 in the left-right direction of the vehicle 1. The rockers 30 extend along the front-rear direction of the vehicle 1. The front suspension members 40 are disposed on the front side F of the electricity storage device 20. The front suspension members 40 are disposed inward of the rockers 30 in the left-right direction. The torque boxes 50 lie side-by-side with the electricity storage device 20 in the horizontal direction. The torque boxes 50 connect the rockers 30 and the front suspension members 40 to each other. The floor panel 60 is disposed on the upper side U of the electricity storage device 20 and connected to the torque boxes 50. The protectors 70 are disposed on the electricity storage device 20. The protectors 70 are disposed so as to face the lower ends 51 of the torque boxes 50 in the horizontal direction.

According to this configuration, when the torque box 50 shifts toward the electricity storage device 20 in the event of a lateral collision of the vehicle 1, the lower end 51 of the torque box 50 comes into contact with the protector 70. As the lower end of the torque box 50 becomes crushed while in contact with the protector 70, the floor panel 60 deforms so as to be pushed upward by the torque box 50. This can reduce the likelihood of contact between the deformed floor panel 60 and the electricity storage device 20 in the event of a lateral collision of the vehicle 1.

Further, in the one embodiment of this disclosure, the electricity storage device 20 includes the electricity storage cells 21 and the housing case 22 that houses the electricity storage cells 21. The housing case 22 has the lower case 221 having the opening 221*a* that opens toward the upper side U, and the upper case 222 disposed so as to cover the opening 221*a*. The upper case 222 has the flange part 222*a* that faces the lower case 221 in the up-down direction. The protectors 70 lie side-by-side with the flange part 222*a* in the horizontal direction.

According to this configuration, in the event of a lateral collision of the vehicle 1, the torque box 50 is likely to come into contact with the protector 70 before coming into contact with the electricity storage device 20, which can reduce the likelihood that the torque box 50 may come into contact with the electricity storage device 20 and deform the electricity storage device 20.

Further, in the one embodiment of this disclosure, the protectors 70 are located only on the lower side of the center of the upper case 222 in the up-down direction.

According to this configuration, the protectors 70 are made comparatively smaller and the weights of the protectors 70 can be reduced.

Further, in the one embodiment of this disclosure, the protectors 70 are disposed on the lower side of the flange part 222*a*.

According to this configuration, for example, when the vehicle 1 including the above-described vehicle lower structure 10 undergoes high-pressure washing or when this vehicle 1 travels on a flooded road, the protectors 70 can reduce the likelihood that a part where the flange part 222*a* of the upper case 222 and the lower case 221 face each other may get splashed with water from below. By extension, the likelihood that water may enter inside the housing case 22 can be reduced.

Further, in the one embodiment of this disclosure, the protectors 70 are in contact with the lower case 221 on the lower side of the flange part 222*a*.

According to this configuration, the protectors 70 can further reduce the likelihood that the part where the flange part 222*a* of the upper case 222 and the lower case 221 face each other may get splashed with water from below. By extension, the likelihood that water may enter inside the housing case 22 can be further reduced.

The embodiment disclosed this time should be construed as being in every respect illustrative and not restrictive. The scope of the present disclosure is indicated not by the description given above but by the claims, and is intended to include all changes within meaning and scope of equivalents of the claims.

What is claimed is:

1. A vehicle lower structure comprising:

an electricity storage device disposed at a lower part of a vehicle;

a rocker lying side-by-side with the electricity storage device in a left-right direction of the vehicle and extending along a front-rear direction of the vehicle;

a front suspension member disposed on a front side of the electricity storage device and disposed inward of the rocker in the left-right direction;

a torque box lying side-by-side with the electricity storage device in a horizontal direction and connecting the rocker and the front suspension member to each other;

a floor panel disposed on an upper side of the electricity storage device and connected to the torque box; and a protector disposed on the electricity storage device and disposed so as to face a lower end of the torque box in the horizontal direction;

wherein:

the electricity storage device includes an electricity storage cell and a housing case that houses the electricity storage cell;

the housing case has a lower case having an opening that opens toward the upper side, and an upper case disposed so as to cover the opening;

the upper case has a flange part that faces the lower case in an up-down direction; and the protector lies side-by-side with the flange part in the horizontal direction.

2. The vehicle lower structure according to claim 1, wherein the protector is located only on a lower side of a center of the upper case in the up-down direction.

3. A vehicle lower structure comprising:

an electricity storage device disposed at a lower part of a vehicle;

a rocker lying side-by-side with the electricity storage device in a left-right direction of the vehicle and extending along a front-rear direction of the vehicle;

a front suspension member disposed on a front side of the electricity storage device and disposed inward of the rocker in the left-right direction;

a torque box lying side-by-side with the electricity storage device in a horizontal direction and connecting the rocker and the front suspension member to each other;

a floor panel disposed on an upper side of the electricity storage device and connected to the torque box; and a protector disposed on the electricity storage device and disposed so as to face a lower end of the torque box in the horizontal direction;

wherein:

the electricity storage device includes an electricity storage cell and a housing case that houses the electricity storage cell;

the housing case has a lower case having an opening that opens toward the upper side, and an upper case disposed so as to cover the opening;

the upper case has a flange part that faces the lower case in an up-down direction; and the protector is disposed on a lower side of the flange part.

4. The vehicle lower structure according to claim 3, wherein the protector is in contact with the lower case on the lower side of the flange part.

* * * * *